United States Patent
Radier et al.

(10) Patent No.: US 8,627,505 B2
(45) Date of Patent: Jan. 7, 2014

(54) TECHNIQUE FOR CONTROLLING ACCESS BY A CLIENT ENTITY TO A SERVICE

(75) Inventors: Benoît Radier, Perros Guirec (FR); Mikaël Salaun, Rosnoen (FR); Andreas Klenk, Holzgerlingen (DE); Michael Kleis, Berlin (DE)

(73) Assignee: France Telecom, Paris (FR)

( * ) Notice: Subject to any disclaimer, the term of this patent is extended or adjusted under 35 U.S.C. 154(b) by 11 days.

(21) Appl. No.: 13/380,403

(22) PCT Filed: Jun. 17, 2010

(86) PCT No.: PCT/FR2010/051212
§ 371 (c)(1),
(2), (4) Date: Dec. 22, 2011

(87) PCT Pub. No.: WO2010/149899
PCT Pub. Date: Dec. 29, 2010

(65) Prior Publication Data
US 2012/0117638 A1      May 10, 2012

(30) Foreign Application Priority Data
Jun. 22, 2009  (FR) ...................................... 09 54233

(51) Int. Cl.
*H04L 29/06*           (2006.01)

(52) U.S. Cl.
USPC ................................................ 726/29; 726/4

(58) Field of Classification Search
USPC ....................................................... 726/4, 29
See application file for complete search history.

(56) References Cited

U.S. PATENT DOCUMENTS

2011/0093938 A1*   4/2011   Asokan et al. ..................... 726/7

OTHER PUBLICATIONS

Klenk et al., "Secure Stateless Trust Negotiation" N2S Conference 2009.
Klenk et al., "Towards Autonomic Service Control in Next Generation Networks" Fourth International Conference on Autonomic and Autonomous Systems, 2008.
International Preliminary Report on Patentability and English translation of the Written Opinion dated Jan. 31, 2012 for corresponding International Application No. PCT/FR2010/051211, filed Jun. 17, 2010.

(Continued)

*Primary Examiner* — Kambiz Zand
*Assistant Examiner* — Michael Guirguis
(74) *Attorney, Agent, or Firm* — David D. Brush; Westman, Champlin & Koehler, P.A.

(57) ABSTRACT

A technique of controlling access by a client entity to a service in a communications network. Processing modules are interconnected in the network in order to supply the service to the client entity. A processing module implements an individual function of a chain of individual functions associated with the service. The access method includes the following steps implemented by an access control device associated with an access node giving access to the service, the device being referred to as a main device: receiving a chain of processing modules from the access node; sending, to a secondary access control device associated with a processing module of the chain, a request to access the processing module under consideration, the request including an access token negotiated between the main device and the client entity; receiving a response to the access request from the secondary device; and notifying the access node of the response.

11 Claims, 3 Drawing Sheets

(56) References Cited

OTHER PUBLICATIONS

International Preliminary Report on Patentability and English translation of the Written Opinion dated Jan. 17, 2012 for corresponding International Application No. PCT/FR2010/051212, filed Jun. 17, 2010.

International Search Report and Written Opinion dated Oct. 13, 2010 for corresponding International Application No. PCT/FR2010/051211, filed Jun. 17, 2010.

Chan et al., "MobiPADS: A Reflective Middleware for Contect-Aware Mobile Computing" IEEE Transactions on Software Engineering, IEEE Service Center, Los Alamitos, CA, US, vol. 29, No. 12, Dec. 1, 2003, pp. 1072-1085, XP011107055.

Kleis et al., "CSP, Cooperative Service Provisioning Using Peer-to-Peer Principles" Self Organizing systems, [Lecture notes in computer science], Springer Berlin Heidelberg, Berlin, Heidelberg, vol. 4725, Sep. 11, 2007, pp. 73-87, XP019100161.

International Search Report and Written Opinion dated Oct. 11, 2010 for corresponding International Application No. PCT/FR2010/051212, filed Jun. 17, 2010.

Lavinal et al., "A Next-Generation Service Overlay Architecture" Annals of Telecommunications, vol. 64, No. 3-4, Jan. 16, 2009, pp. 175-185, XP002584144.

Transnexus: "Secure, Multi-Lateral Peering with OpenSER 1.1.1" Jun. 1, 2007, XP002584145 URL:http://www.transnexus.com/White%20Papers/White%20Papers.htm (via Google).

Klenk et al., "Towards Autonomic Service Control in Next Generation Networks" Autonomic and Autonomous Systems, 2008. ICAS 2008. Fourth International Conference on, IEEE, Piscataway, NJ, USA, Mar. 16, 2008, pp. 266-271, XP031242956.

* cited by examiner

TECHNIQUE FOR CONTROLLING ACCESS BY A CLIENT ENTITY TO A SERVICE

CROSS-REFERENCE TO RELATED APPLICATIONS

This Application is a Section 371 National Stage Application of International Application No. PCT/FR2010/051212, filed Jun. 17, 2010, which is incorporated by reference in its entirety and published as WO 2010/149899 on Dec. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of telecommunications and it relates in particular to a technique for controlling access by a client entity to a service.

BACKGROUND OF THE DISCLOSURE

In a communications network, a plurality of nodes may form an overlay network and thus be connected to one another. By way of example, the overlay network may be of the peer-to-peer type, referred to below as a P2P network. In such an overlay network, the nodes, referred to as "peers", are interchangeable and possess capacities and responsibilities within the network that are equivalent, in contrast to an architecture of the client-server type. Such an overlay network does not rely on its own infrastructure, but on one or more communications networks that are already in place. It makes use of the resources of said underlying network(s) but without necessarily having any knowledge of their physical topology (ies). A communications network is said to underlie the overlay network.

The article entitled "Towards autonomic service control in next generation networks" by A. Klenk et al. and published in the ICAS08 Conference proposes a method of enabling a service to be introduced in autonomic manner in the overlay network. In an initial stage, an operator seeking to offer access to the service and a supplier of the service negotiate a contract prior to receiving a first request to implement the service, with the contract, referred to as a "multimedia transport service agreement", including at least one constraint for implementing the service, e.g. a quality of service constraint. This first stage of negotiation serves to break down a service request into a chain of individual functions. For example, such functions are a video stream transcoding function, an error correction function, a watermarking function, . . . . In a second stage, implemented when a service access request is received from a client entity, nodes having processing modules needed for implementing the individual functions are then determined. Thereafter, depending on the result of this determination, the interconnections that are needed between the processing modules are in turn determined, while taking account firstly of the constraint(s) for implementing the service as specified in the contract and secondly of the costs of implementing the service. During a third stage, the service is supplied to the client entity while using the connections between the processing modules as set up during the second stage.

Nevertheless, one of the determined processing modules may be protected by an access control device. The device supplying the service may also be protected by such a device. The client entity then needs to identify itself with those devices before being able to use the processing modules.

If access by the client entity to any one of the processing modules is not authorized, then it is not possible to supply the service to the client entity. The client entity then needs to reiterate the various stages of the method in order to obtain the same service or indeed to select a new service. Furthermore, there are resources that have been reserved, but that end up not being used.

SUMMARY

In a first aspect, an embodiment of the invention provides a method of controlling access by a client entity to a service in a communications network, processing modules being designed to be interconnected in said network in order to provide the service to the client entity, where a processing module implements an individual function in a chain of individual functions associated with said service, said method comprising the following steps that are implemented by an access control device associated with an access node giving access to said service, said device being referred to as a main device:
  a step of receiving, from said access node, a chain of processing modules;
  a step of sending, to an access control device referred to as a secondary device and associated with the processing module of the chain, a request to access the processing module in question, said request including an access token negotiated between the main device and the client entity;
  a step of receiving, from the secondary device, a response to the access request; and
  a step of notifying said access node of the response received.

In order to implement the service to the client entity, a chain of individual functions is provided. The term "individual function" is used to mean, for example, a function of transcoding, metering, legal interception, watermarking, . . . . Such an individual function is described by input parameters, a function, and output parameters. The chain of individual functions then represents a sequence of processes to be implemented from a device supplying the service and presenting certain output parameters to the client entity that presents certain input parameters. The processes are implemented by various processing modules in the communications network. The access control method relies on the various secondary access control devices delegating to the primary access control device the negotiation of the confidence relationship between them and the client entity. The primary access control device then verifies with the various access control devices associated with respective ones of the processing modules whether it is possible to use the processing module in order to implement the service for the particular client entity. This verification is performed using an "access token". The term access token is used to mean proof of an agreement between two parties. In the present circumstances, it is an agreement between the client entity and the main access control device, representing the operator giving access to the service. Thus, if this is not possible for any of the processing modules, this particular chain of processing modules will not be reserved for the client entity. This avoids reserving resources in the communications network when access by the client entity to one or more of the processing modules is not possible. The access request made to the various secondary access control devices may be sent in parallel or in succession. It should be observed that it is possible for some of the processing modules not to be protected by a secondary device. Furthermore, the access token is sent by the main access control device, which is located in the operator network giving access to the service. The token is thus sent over links that are generally of large capacity. The main access control device may in particular have a large capacity link enabling it to dialog over links of different types simultaneously. In contrast, in the prior art, the client entity may be connected to the communications network via an underlying mobile network. The negotiation by the client entity for access tokens giving access to the various secondary access control devices associated with the processing modules may give rise to heavy use of the resources in the underlying mobile network. Thus, the steps of controlling access with the various processing modules, such as those implemented by the access control method, are performed more quickly and make it possible to reduce the time needed for supplying the service. Furthermore, since controlling access to the chain of processing modules is performed as a preliminary operation, the client entity is not sent any positive response to a request for access to the service it has sent, in the event of it turning out in the end not to be possible for the client entity to access the resources of the communications network.

According to a particular characteristic, the method further includes a step of negotiating access to the service by the client entity, at the end of which step the access token is generated, prior to receiving the chain of processing modules.

Since the negotiation step takes place before the step of receiving a chain of processing modules from the service access node, it is then possible, in the event of a failure, to refuse the service to the client entity before reserving resources in the communications network. This serves to optimize utilization of network resources.

According to another particular characteristic, the access token is certified by the main device.

Thus, the operator giving access to the service serves to guarantee the client entity.

According to another particular characteristic, the access request further includes a request to authorize routing data between the processing module under consideration and a processing module that precedes it in the chain, and between the processing module under consideration and a processing module that follows it in the chain.

Thus, the device giving access to the processing module has available the information needed for routing data in order to provide the service.

Correspondingly, an embodiment of the invention also provides a method of determining a chain of processing modules for supplying a service to a client entity in a communications network, the processing modules being designed to be interconnected in the network in order to provide the service to the client entity, where a processing module implements an individual function of a chain of individual functions associated with the service, said method comprising the following steps implemented by an access node giving access to said service:

a step of determining a chain of processing modules from a chain of individual functions associated with the service;

a step of sending the determined chain of processing modules to an access control device that is associated with said access node, and referred to as a main device; and a step of receiving, from the main device, a notification including at least one response to a request for access to an access control device associated with a processing module;

the steps of the determination method being suitable for being reiterated in the event of access to one of the processing modules being refused.

In the event of any one of the access devices refusing access, the service access node then has the option of determining a new chain of processing modules. A refusal, if any, is thus detected as soon as possible, thereby making it possible to obtain a new chain after one or more new iterations, so as to enable the client entity to obtain the service. In the prior art, the only option available to the client entity in the event of a refusal of access to any one of the processing modules consists in making a new request for access to the service or in making a request to access another service.

In a second aspect, an embodiment of the invention provides an access control device for controlling access by a client entity to a service in a communications network, said access control device being associated with an access node giving access to said service, and comprising:

receiver means for receiving, from said access node, a chain of processing modules designed to be interconnected in said network in order to provide the service to the client entity, where a processing module implements an individual function of a chain of individual functions associated with said service;

sender means for sending, to another access control device associated with a processing module of the chain, a request for access to the processing module under consideration, said request including an access token certified by the main device;

receiver means for receiving, from the other device, a response to the access request; and notification means for notifying said access node of the received response.

In a third aspect, an embodiment of the invention provides a determination device for determining a chain of processing modules for supplying a service to a client entity in a communications network, the processing modules being designed to be interconnected in the network in order to supply the service to the client entity, where a processing module implements an individual function of a chain individual functions associated with the service, said device comprising:

determination means for determining a chain of processing modules from a chain of individual functions associated with the service;

sender means arranged to send, to an access control device that is referred to as a main device and that is associated with said access node, the determined chain of processing modules;

receiver means for receiving, from the main device, a notification including at least a response to a request to access an access control device associated with a processing module; and control means arranged to control the determination means in the event of access being refused to one of the processing modules, in order to determine a new chain of processing modules.

In a fourth aspect, an embodiment of the invention provides a determination system for determining a chain of processing modules for supplying a service to a client entity in a communications network, the processing modules being designed to be interconnected in the network in order to supply the service to the client entity, where a processing module implements an individual function of a chain of individual functions associated with the service, said system including at least one determination device as described above and an access control device as described above associated with said determination device.

In a fifth aspect, an embodiment of the invention provides a computer program including instructions for implementing the access control by an access control device when the program is executed by a processor.

In a sixth aspect, an embodiment of the invention provides a computer program including instructions for implementing the method as described above for determining a chain of processing modules by a determination device, when said program is executed by a processor.

BRIEF DESCRIPTION OF THE DRAWINGS

The disclosure can be better understood from the following description of a particular implementation of the method of an embodiment of the invention, given with reference to the accompanying drawings, in which.

DETAILED DESCRIPTION OF ILLUSTRATIVE EMBODIMENTS

Figure 1:
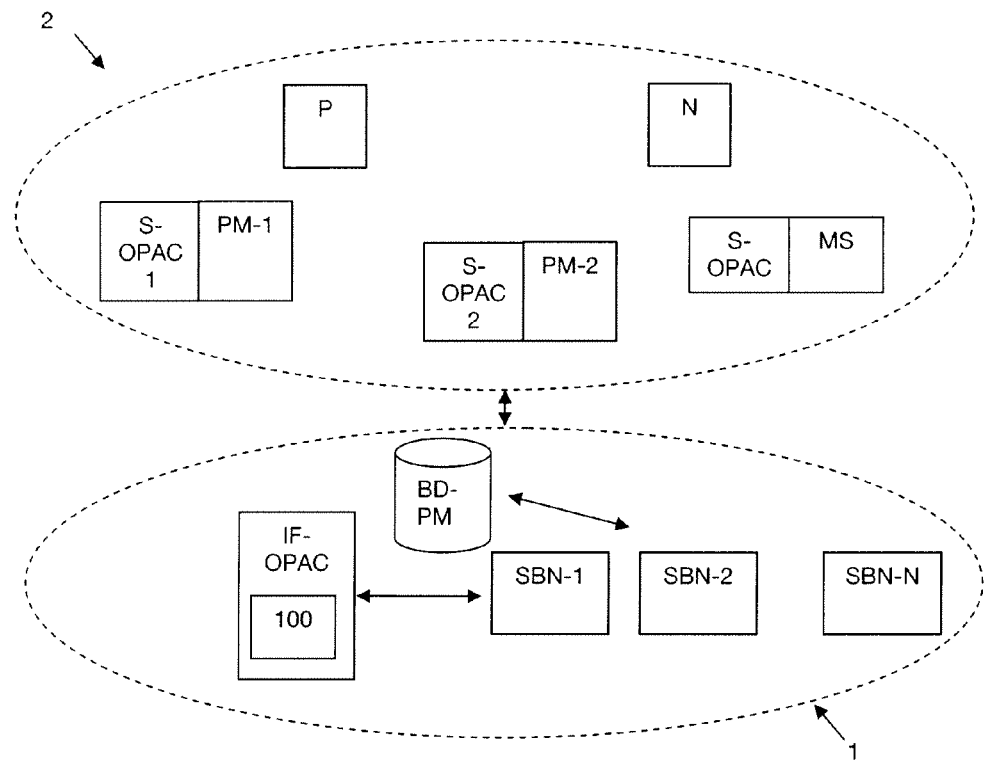
FIG. 1 shows a system for determining a chain of processing modules in its environment in a particular embodiment of the invention.

A system 1 for determining a chain of processing modules for providing a service to a client entity in a communications network 2 is shown diagrammatically in FIG. 1. An overlay network is a particular communications network. Below, the terms are used interchangeably. The system 1 comprises a plurality of service access nodes SBN-1, . . . , SBN-N for "service bootstrap node". A terminal N is also shown in FIG. 1. Below the term "client entity" is used to designate the terminal N or the user U of the terminal N. In an embodiment of the invention, the system 1 also includes an access control entity referenced IF-OPAC for "interface overlay proxy access control", which entity is administered by the operator giving access to the service. This access control entity IF-OPAC includes in particular a device 100 for controlling the access of a client entity to a service. The system 1 also includes a database processing module BD-PM that stores the processing modules made available by entities of the communications network. These entities are shown in part in FIG. 1 and they are described in greater detail below. For each processing module, there is stored an address in the communications network that gives access to the processing module, the address being stored together with constraints associated with said access. The database may in particular take the form of a distributed hash table (DHT). Optionally, the database BD-PM also stores a secret key that is shared between the access control device IF-OPAC and an access control device associated with the processing module in question.

A portal P is also shown, and for a given service S it stores a service identifier SID and addresses of access nodes SBN to the service.

Other entities of the overlay network are also shown in part in FIG. 1, in the form of a resource PM-1, PM-2, MS that is made available in the overlay network, and in the form of respective associated access control devices S-OPAC1, S-OPAC2, S-OPAC. Each resource or processing module PM-1 and PM-2 represents particular means suitable for implementing an individual function in the overlay network. In order to avoid overloading FIG. 1, only two processing modules are shown. Naturally, an overlay network entity may offer one or more processing modules. The resource MS constitutes a service module and it is a particular processing module serving to provide the service to the client entities of the overlay network. As an example of a service, mention may be made of a service for broadcasting multimedia data, a service giving access to remote surveillance data, a service for storing files. In FIG. 1, each processing module has an associated access control device. Naturally, processing modules need not be protected by such a device.

In order to enable the client entity N to access the service S, a chain of individual functions TSID needs to be determined. According to the article entitled "Towards autonomic service control in next generation networks" by A. Klenk et al. and published in the ICAS08 Conference, such a chain of individual functions is defined during the stage of negotiation between the service supplier and the telecommunications network supplier. At the end of the negotiation stage, the service is defined by:

a unique service identifier SID;
a set of individual data-processing functions $P_{SID}$; and
a set of constraints associated with the service $C_{SID}$. These constraints comprise parameters associated with the service and authorizations for access to the service. By way of example, the parameters associated with the service are the place of access, the time of access, the manner of access, and quality of service parameters, such as a maximum acceptable cost, a maximum acceptable delay, a required passband, . . . . The constraints may also be specified between the elements of the processing chain.

This information that as a whole defines the service identified by the service identifier SID is referred to below as a processing chain template. It comprises an ordered chain of individual functions $P_i$.

An individual data-processing function is represented in the form of a triplet (I, P, O) where I represents the input format that the processing function P can process, and O represents the output format that results from implementing the processing function P. When any input format is acceptable, this is represented by the character "*".

By way of example, an individual function $P_i$ is a legal interception, a localization function, a watermarking function, a transcoding function, a cache function, a network address translation (NAT) function, a deep packet inspection (DPI) function, a presence function, a bridge-conference function. This list is naturally not exhaustive. Below, this chain of individual functions is written as follows:

$$(I_{MS},O_{MS}) \sim (I,P_1,O) \sim (I,P_2,O) \sim \ldots (*,P_i,O) \sim (I_{MC},O_{MC})$$

where MS represents the service and MC represents the client entity.

Figure 2:
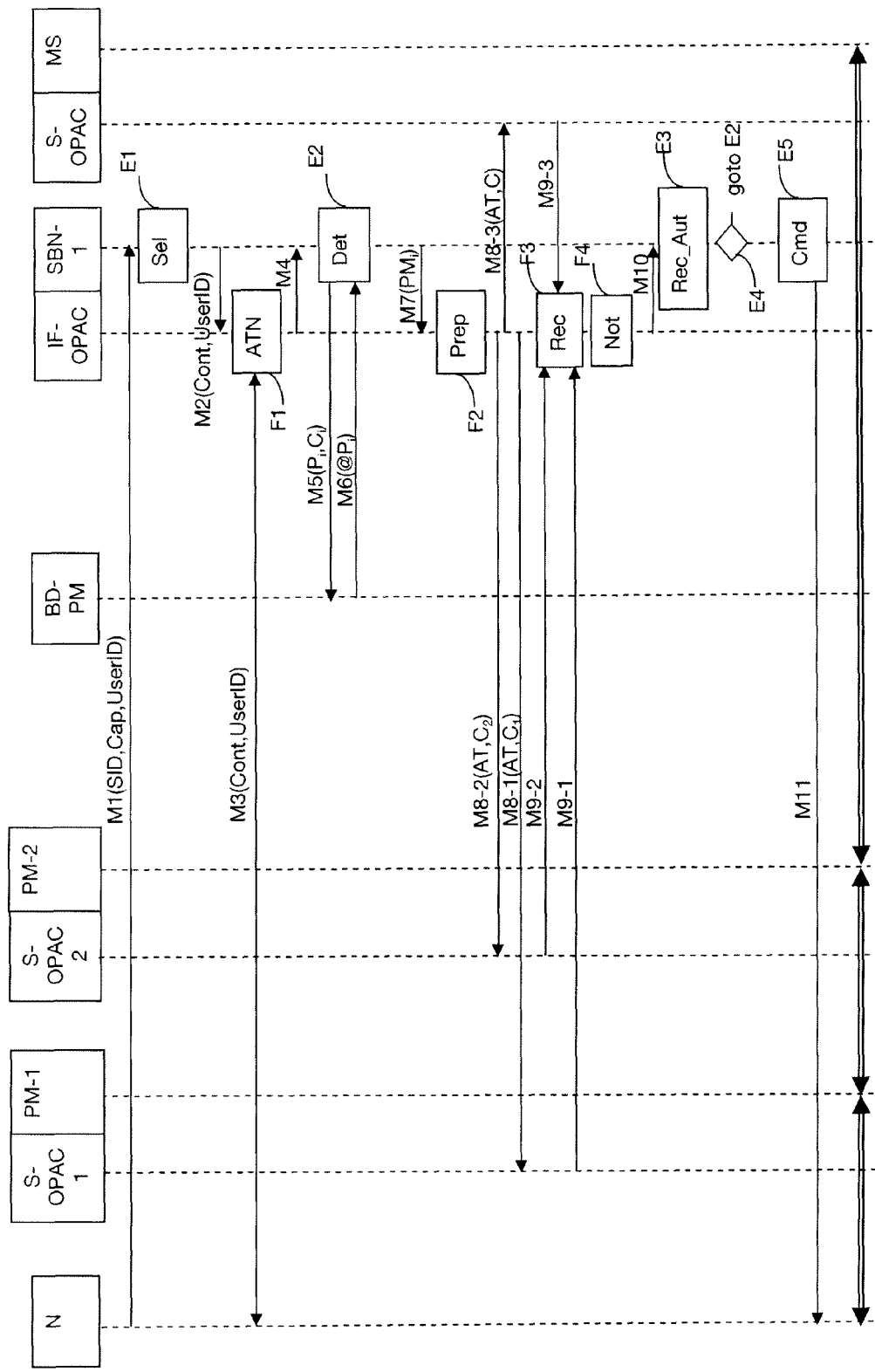
FIG. 2 shows the steps of the method in a particular implementation of the invention.

The method of controlling access to a service by a client entity as implemented in a particular embodiment of the access control device, and the method of determining a chain of processing modules as implemented by a service access node in this particular embodiment are described below with reference to FIG. 2.

A prior negotiation stage is implemented between an operator seeking to offer access to the service and the service supplier S, which negotiation leads to a service contract Cont being defined that comprises a processing chain template, referred to below as a chain of individual functions.

The client entity N seeking access to a service S, supplied by the processing module MS, initially contacts the portal P in order to obtain the service identifier SID and the addresses of access nodes SBN to the service. Thereafter, the client entity N selects an access node SBN-1 to the service and sends a request M1 to access the service S to said selected access node. This access request M1 (SID, Cap, UserID) comprises an identifier of the service SID, the capacities Cap of the client entity, and an identifier UserID of the user of the client entity.

The access request M1 is received by the service access node SBN-1 in a step E1 of the determination method. Still in this step E1, the service access node SBN-1 searches for the contract Cont associated with the service, e.g. in a database, and thus obtains a chain of individual functions associated with the service. The access node SBN-1 then sends a message M2 to the access control entity IF-OPAC. The message M2 (Cont, UserID) comprises the contract as negotiated between the operator enabling the service to be accessed and the service supplier S, together with the identifier UserID of the user of the client entity.

The message M2 is received by the access control entity IF-OPAC in a step F1 of the access control method. The access control entity IF-OPAC negotiates an access token with the client entity N, which token gives access to the service AT. This negotiation is represented in FIG. 2 in the form of an arrow carrying a composite message M3 comprising the contract Cont and the identifier UserID of the user of the client entity. Such a negotiation, known as an automatic trust negotiation (ATN) is described in greater detail in the article "Secure stateless trust negotiation" by A. Klenk et al., published in the 2009 N2S Conference. It serves to guarantee that the client entity N does indeed accept the terms of the contract. A confidence relationship is established between the access control entity IF-OPAC and the client entity N. This confidence relationship is represented by the access token defining the conditions for access to the processing module. This access token may be in the form of a page drawn up in accordance with a language specification such as extensible access control markup language (XACML).

Still during this step F1 of the access control method, the access control entity IF-OPAC verifies that the user is indeed the stated user. Once these two substeps of negotiation and of identity verification have been accomplished successfully, the access control entity IF-OPAC stores the negotiated access token AT and sends an agreement M4 to the service access node SBN-1. Otherwise, i.e. in the event of either of the two substeps failing, the access control entity sends a refusal to the service access node SBN-1, leading to said node rejecting the request made by the client entity N for access to the service. This rejection takes place before reserving any resources in the communications network. This serves to optimize utilization of the resources of the network.

The message M4 is received by the service access node SBN-1 in a step E2 of the determination method. It then sends a request M5 to the database BD-PM searching for nodes in the overlay network that propose the processing modules $PM_i$ for implementing the individual functions as requested and such that the connections between the various nodes serve to satisfy the constraint $C_i$ associated with the chain of individual functions. The method then performs the search, e.g. using the technique described in the above-mentioned ICAS08 Conference article. Once the chain of processing modules has been determined, it is sent in a response message M6 to the service access node SBN-1. The response message M6 comprises in particular the respective addresses in the communications network of the processing modules. As an option, when the database BD-PM has stored a secret key that is shared between a processing module and the access control entity IF-OPAC, the key is also sent in the response message M6.

The response M6 is received by the service access node SBN-1, still in this step E2. Thereafter, the access node SBN-1 sends a message M7 to the access control entity IF-OPAC, which message includes the chain of processing modules $PM_i$ and the addresses of those processing modules in the overlay network. This message M7 thus requests the access control entity IF-OPAC to verify whether the processing modules allow access to the client entity N. In the implementation described, the message M7 comprises the chain of processing modules (PM-1, PM-2, MS).

The message M7 is received by the access control entity IF-OPAC in a step F2 of the access control method. The access control entity IF-OPAC then sends a message M8-1 to the access control device S-OPAC1 associated with the processing module PM-1, which message includes the access token AT as determined and stored during the step F1 of the access control method, together with the constraint(s) $C_i$. The message M8-1 requests authorization to route data to and from the processing module PM-1. More precisely, it also specifies a port number to be used for communicating between two processing modules together with the protocol that is to be used. As an option, when the database BD-PM has stored a secret key shared between the processing module PM-1 and the access control entity IF-OPAC, the access token is certified by the control entity IF-OPAC using the secret key.

For example, it is possible to use the XACML language specification to certify the information sent by the client entity or obtained by a third party identity supplier and to make transactions secure in the manner described in the article "Secure stateless trust negotiation" by A. Klenk et al., published in the 2009 N2S Conference.

Likewise, a message M8-2 is sent to the access control device S-OPAC2 associated with the processing module PM-2, and a message M8-3 is sent to the access control device S-OPAC3 associated with the entity that supplies the service MS.

Thus, only the access control entity IF-OPAC negotiates the access token AT with the client entity N, which token is then sent to the various processing modules. Subsequent access by the client entity N is thus simplified since there is no need for client entity to negotiate with each of these processing modules in the chain. The client entity thus benefits from the confidence relationship that exists between the access control devices S-OPAC associated with the processing modules and the access control entity IF-OPAC.

The access control device S-OPAC1 verifies whether the client entity N can access the processing module PM-1.

If the client entity N cannot access the processing module PM-1, the access control device S-OPAC1 sends a message M9-1 indicating a refusal.

If the client entity N is entitled to access the processing module PM-1, then the access control device S-OPAC1 authorizes data to be routed between the processing module under consideration and the preceding processing module in the chain of processing modules, and also between the processing module under consideration and the following processing module in the chain of processing modules. The access control device S-OPAC1 also reserves the resources needed for providing the service, as defined by the constraint(s) $C_1$. In the implementation described, the access control device S-OPAC1 authorizes data to be routed between the client entity N and the processing module PM-1, and then between the processing module PM-1 and the processing module PM-2. Thereafter, the access control device S-OPAC1 sends a message M9-1 indicating an agreement.

The same applies for the access control device S-OPAC2 or S-OPAC, each of which sends a respective response message M9-2 or M9-3 to the access control entity IF-OPAC.

These responses messages M9-1, M9-2, M9-3 are received in a step F3 of the access control method.

By way of example, the messages M8-1, M8-2, and M8-3 are authorization request messages in accordance with the XACML language specification. By way of example, the messages M9-1, M9-2, and M9-3 are authorization response messages, still in accordance with that specification.

In a step F4 of the access control method, the control entity IF-OPAC sends a message M10 to the service access node SBN-1, which message includes the results obtained for the verifications that have been performed. If one of the processing modules has not accepted access by the client entity N, the message M10 is a message rejecting the chain of processing modules. Otherwise, i.e. if all of the processing modules in the chain have accepted access by the client entity N, then the message M10 is a message agreeing to the chain of processing modules.

The message M10 is received by the service access node SBN-1 in a step E3 of the determination method. If during a step E4 of the determination method it is determined that the message is a rejection, then the determination method returns to the step E2 in order to reiterate steps E2, E3, and E4 of the method. Thus, a refusal by any one of the processing modules is detected before the chain of processing modules is sent to the client entity N, and this allows the determination system 1 to determine a new chain of processing modules. Under such circumstances, in the prior art, resources used to be reserved without being used subsequently. Furthermore, the client entity N then needed to send a new service access request or indeed to select a new service.

In this step E4 of the determination method it is possible to verify that the number of iterations that have been performed for the purpose of determining a chain of processing modules is below a predetermined threshold. This serves to avoid overloading the determination system 1 and to limit the waiting time for the client entity N.

If during the step E4 of the determination method it is determined that there is an agreement, i.e. that a chain of processing modules has been determined in which all of the processing modules accept access by the client entity N, then the determination method sends a message M11 in a step E5, which message contains the address in the overlay network of the first processing module PM-1 and the constraint(s) with which the client entity N needs to comply in order to access the service. Since the routing of data between the various processing modules has been authorized and since the resources needed for obtaining the requested quality of service have been reserved, the client entity N can now access the service. This is represented in FIG. 2 by double-headed arrow segments between the client entity N and the processing module PM-1, between the processing module PM-1 and the processing module PM-2, and then to finish off between the processing module PM-2 and the entity that supplies the service. By means of the methods of an embodiment of the invention, the client entity N obtains access more quickly than in the prior art, it being given that the access control entity IF-OPAC guarantees the client entity N with respect to the access control devices. The client entity N will access the service successfully since each of processing modules in the chain as determined has given its agreement to supply the service.

In a variant of the above-described implementation, the access control entity IF-OPAC need not request the reservation of resources between the various processing modules in the messages M8-1, M8-2, M8-3. In this variant, the control entity IF-OPAC requests only the routing of data and it is the service access node SBN-1 that requests the processing modules to reserve resources during the step E5 of the determination method prior to sending the message M11 to the client entity N. This variant presents the additional advantage of remaining compatible with the method described in the ICAS08 Conference article.

As an illustrative example, there follows a description of an implementation of a system for remote surveillance of a home by using the methods of an embodiment of the invention. Naturally, the method is not restricted to this example.

The state of negotiation between the operator offering access to services and the supplier of the remote surveillance service leads to a service contract being recorded, which contract includes a chain of individual functions within the means accessed by the service access node SBN-1. The published service makes the service available to friends only. A client entity "alice@orange.fr" sends a request to access this service, the request including its own characteristics.

During the step F2 the access control entity IF-OPAC verifies in particular with the access control device S-OPAC associated with the device that offers the remote surveillance service that the client entity N is indeed authorized to access the service. The access control device S-OPAC verifies that the client entity "alice@orange.fr" is indeed one of the friends authorized to access the service. It is only the access control device S-OPAC that is in a position to perform such verification. Similarly, the use of a processing module may be reserved for client entities presenting an address in the domain "brevet.fr". During this step F2, the access control entity IF-OPAC may verify with the access control device in question whether access is possible by the client entity. The response may thus be negative if the processing module desires not to give access to client entities of the domain "orange.fr".

Figure 3:
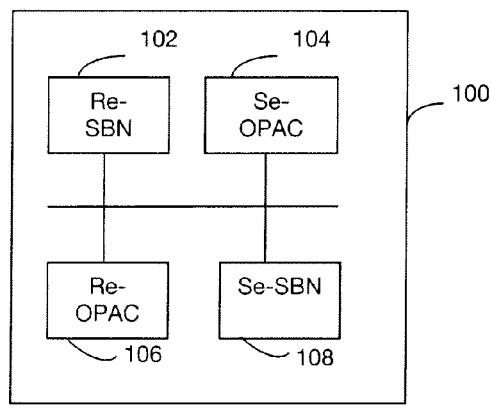
FIG. 3 shows an access control device in a particular embodiment of the invention.

An access control device 100 associated with a node giving access to a service is described below with reference to FIG. 3.

Such a device 100 comprises:

a receiver module 102 for receiving, from said access node, a chain of processing modules that are to be interconnected in said network in order to supply the service to the client entity N, where a processing module implements an individual function in a chain of individual functions associated with said service;

a sender module 104 for sending, to another access control device associated with a processing module of the chain, a request to access the processing module under consideration, said request including an access token certified by the main device;

a receiver module 106 for receiving, from the other device, a response to the access request; and a notification module 108 for notifying said access node of the response received.

The modules 104 and 106 are also arranged to negotiate access to the service by the client entity, thereby generating, at the end of the negotiation, the access token.

The module 104 is also arranged to certify the access token using a secret key that is shared between itself and the other access control device.

The access control device 100 is designed to be incorporated in the access control entity IF-OPAC.

The access control device 100 may be incorporated in the client entity that supplies the service, in a firewall, or in a border gateway function.

Figure 4:
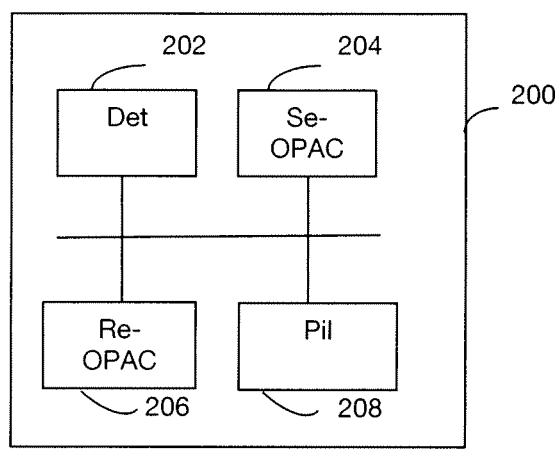
FIG. 4 shows a device for determining a chain of processing modules in a particular embodiment of the invention.

A determination device 200 for determining a chain of processing modules as shown in FIG. 4 comprises:
- a determination module 202 for determining a chain of processing modules from a chain of individual functions associated with the service;
- a sender module 204 arranged to send the determined chain of processing modules to an access control device associated with said access node and referred to as the main device;
- a receiver module 206 for receiving a notification from the main device, which notification includes at least a response to a request to access an access control device associated with a processing module; and
- a control module 208 arranged to control the determination means in the event of a refusal of access to one of the processing modules in order to determine a new chain of processing modules.

The device 200 for determining a chain of processing modules may be incorporated in a service access node SBN-1, ..., SBN-N.

The modules 102, 104, 106, and 108 are arranged to implement the above-described method of controlling access to a service. They are preferably software modules comprising software instructions for causing the steps of the above-described access control method to be executed when implemented by the access control device.

An embodiment of the invention thus also provides:
- a program for a device controlling access to a service, the program including program code instructions for controlling the execution of steps of the above-described access control method when said program is executed by said device; and
- a recording medium readable by a device for controlling access to a service and having recorded thereon the program for a device.

The modules 202, 204, 206, and 208 are arranged to implement the above-described method of determining a chain of individual functions. It preferably comprises software modules including software instructions for executing the steps of the above-described determination method when implemented by the device for determining a chain of processing modules. An embodiment of the invention thus also provides:
- a program for a device for determining a chain of processing modules, the program including program code instructions for controlling the execution of the steps of the above-described determination method when said program is executed by said device; and
- a recording medium readable by a device for determining a chain of processing modules and having recorded thereon the program for a device.

The software modules may be stored in or transmitted by a data medium. The medium may be hardware storage medium such as, for example a compact disk read only memory (CD-ROM), a magnetic floppy disk, or a hard disk, or indeed a transmission medium such as an electrical, optical, or radio signal, or a telecommunications network.

An embodiment of the invention also provides the system 1 for processing a request for a client entity N to access a service, the system including at least one device SBN-1, SBN-N, 200 for determining a chain of processing modules and an access control device IF-OPAC, 100 as described above.

Although the present disclosure has been described with reference to one or more examples, workers skilled in the art will recognize that changes may be made in form and detail without departing from the scope of the disclosure and/or the appended claims.

The invention claimed is:

1. A method of controlling access by a client entity to a service in a communications network, wherein processing modules are interconnected in said network in order to provide the service to the client entity, where a processing module implements an individual function in a chain of individual functions associated with said service, said method comprising the following steps that are implemented by an access control device associated with an access node giving access to said service, said device being referred to as a main device:
- a step of receiving from said access node a request to control access to at least one processing module of a chain of processing modules, said chain being determined by said access node;
- a step of sending, to an access control device referred to as a secondary device and associated with the processing module of the chain, a request to access the processing module in question, said request including an access token negotiated between the main device and the client entity;
- a step of receiving, from the secondary device, a response to the access request; and
- a step of sending a notification to said access node, the notification including at least the response received from the secondary device.

2. The method according to claim 1, further including a step of negotiating access to the service by the client entity, at the end of which step the access token is generated, prior to receiving the chain of processing modules.

3. The method according to claim 1, wherein the access token is certified by the main device.

4. The method according to claim 1, wherein the access request further includes a request to authorize routing data between the processing module under consideration and a processing module that precedes the processing module under consideration in the chain, and between the processing module under consideration and a processing module that follows the processing module under consideration in the chain.

5. A method of determining a chain of processing modules for supplying a service to a client entity in a communications network, wherein the processing modules are interconnected in the network in order to provide the service to the client entity, where a processing module implements an individual function of a chain of individual functions associated with the service, said method comprising the following steps implemented by an access node giving access to said service:
- a step of determining a chain of processing modules from the chain of individual functions associated with the service;
- a step of sending to an access control device associated with said access node, referred to as a main device, a request for controlling access to at least one processing module of the determined chain of processing modules; and
- a step of receiving, from the main device, a notification including at least one response to a request for access to an access control device associated with a processing module.

6. An access control device for controlling access by a client entity to a service in a communications network, said access control device being associated with an access node giving access to said service, and comprising:

receiver means for receiving, from said access node, a request for controlling access to at least one processing module of a chain of processing modules as determined by said access node, the processing modules being designed to be interconnected in said network in order to provide the service to the client entity, a processing module implementing an individual function of a chain of individual functions associated with said service;

sender means for sending, to another access control device associated with a processing module of the chain, a request for access to the processing module under consideration, said request including an access token certified by the main device;

receiver means for receiving, from the other device, a response to the access request; and sender means for sending a notification to said access node, the notification including at least the response received from the other device.

7. A determination device for determining a chain of processing modules for supplying a service to a client entity in a communications network, the processing modules being designed to be interconnected in the network in order to supply the service to the client entity, where a processing module implements an individual function of a chain individual functions associated with the service, said device comprising:

determination means for determining a chain of processing modules from a chain of individual functions associated with the service;

sender means arranged to send, to an access control device that is referred to as a main device and that is associated with said access node, a request for controlling access to at least one processing module of the determined chain of processing modules;

receiver means for receiving, from the main device, a notification including at least a response to a request to access an access control device associated with a processing module; and control means arranged to control the determination means in the event of access being refused to one of the processing modules, in order to determine a new chain of processing modules.

8. A determination system for determining a chain of processing modules for supplying a service to a client entity in a communications network, the processing modules being designed to be interconnected in the network in order to supply the service to the client entity, where a processing module implements an individual function of a chain of individual functions associated with the service, said system including:

at least one determination device comprising:
determination means for determining a chain of processing modules from a chain of individual functions associated with the service;
sender means arranged to send a request for controlling access to at least one processing module of the determined chain of processing modules;
receiver means for receiving a notification including at least a response to a request to access a first access control device associated with a processing module; and
control means arranged to control the determination means in the event of access being refused to one of the processing modules, in order to determine a new chain of processing modules; and a further access control device associated with said determination device, and referred to as a main device, for controlling access by a client entity to a service in a communications network, said main device comprising:

receiver means for receiving, from said determination device, the request for controlling access to at least one processing module of the chain of processing modules;

sender means for sending, to the first access control device, a request for access to the processing module under consideration, said request including an access token certified by the main device;

receiver means for receiving, from the first access control device, a response to the access request; and sender means for sending a notification to said determination device, the notification including at least the response received from the first access control device.

9. A hardware storage medium comprising a computer program stored thereon and including instructions for implementing a method of controlling access by a client entity to a service in a communications network by an access control device when the program is executed by a processor, processing modules being designed to be interconnected in said network in order to provide the service to the client entity, where a processing module implements an individual function in a chain of individual functions associated with said service, said method comprising the following steps that are implemented by the access control device associated with an access node giving access to said service, said device being referred to as a main device, wherein the method comprises:

receiving from said access node a request to control access to at least one processing module of a chain of processing modules, said chain being determined by said access node;

sending, to an access control device referred to as a secondary device and associated with the processing module of the chain, a request to access the processing module in question, said request including an access token negotiated between the main device and the client entity;

receiving, from the secondary device, a response to the access request; and sending a notification to said access node, the notification including at least the response received from the secondary device.

10. A hardware storage medium comprising a computer program stored thereon and including instructions for implementing a method for supplying a service to a client entity in a communications network, when said program is executed by a processor, wherein processing modules are interconnected in the network in order to provide the service to the client entity, where a processing module implements an individual function of a chain of individual functions associated with the service, said method comprising the following steps implemented by an access node giving access to said service:

determining a chain of processing modules from the chain of individual functions associated with the service;

sending to an access control device associated with said access node, referred to as a main device, a request for controlling access to at least one processing module of the determined chain of processing modules; and receiving, from the main device, a notification including at least one response to a request for access to an access control device associated with a processing module.

11. The method according to claim 5, wherein the steps of the method are reiterated in the event of access to one of the processing modules being refused.

* * * * *

UNITED STATES PATENT AND TRADEMARK OFFICE
CERTIFICATE OF CORRECTION

| | | |
|---|---|---|
| PATENT NO. | : 8,627,505 B2 | Page 1 of 1 |
| APPLICATION NO. | : 13/380403 | |
| DATED | : January 7, 2014 | |
| INVENTOR(S) | : Radier et al. | |

It is certified that error appears in the above-identified patent and that said Letters Patent is hereby corrected as shown below:

In the Claims

Column 13:

Claim 7, line 24, insert --of-- after "chain".

Signed and Sealed this
Thirtieth Day of June, 2015

Michelle K. Lee
*Director of the United States Patent and Trademark Office*